United States Patent
Rudmann et al.

(10) Patent No.: US 9,977,153 B2
(45) Date of Patent: May 22, 2018

(54) STACKS OF ARRAYS OF BEAM SHAPING ELEMENTS INCLUDING STACKING, SELF-ALIGNMENT AND/OR SELF-CENTERING FEATURES

(71) Applicant: Heptagon Micro Optics Pte. Ltd., Singapore (SG)

(72) Inventors: Hartmut Rudmann, Jona (CH); Markus Rossi, Jona (CH); Mario Cesana, Au (CH); Ohad Meitav, Sunnyvale, CA (US); Peter Roentgen, Thalwil (CH); Jukka Alasirniö, Jääli (FI); Stephan Heimgartner, Passugg (CH); Kai Engelhardt, Buckenhof (DE)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days. days.

(21) Appl. No.: 15/116,599

(22) PCT Filed: Feb. 2, 2015

(86) PCT No.: PCT/SG2015/000028
§ 371 (c)(1),
(2) Date: Aug. 4, 2016

(87) PCT Pub. No.: WO2015/119571
PCT Pub. Date: Aug. 13, 2015

(65) Prior Publication Data
US 2016/0349414 A1 Dec. 1, 2016

Related U.S. Application Data

(60) Provisional application No. 61/936,920, filed on Feb. 7, 2014, provisional application No. 61/950,464, filed on Mar. 10, 2014.

(51) Int. Cl.
*G02B 27/10* (2006.01)
*G02B 3/00* (2006.01)
(Continued)

(52) U.S. Cl.
CPC .......... *G02B 3/0062* (2013.01); *G02B 7/003* (2013.01); *G02B 7/021* (2013.01); *G02B 7/022* (2013.01); *G02B 27/0961* (2013.01)

(58) Field of Classification Search
CPC .. G02B 3/0062; G02B 27/0961; G02B 7/003; G02B 7/021; G02B 7/022
See application file for complete search history.

(56) References Cited

U.S. PATENT DOCUMENTS 6,731,431 B2 5/2004 Sekine
7,187,501 B2 3/2007 Wakisaka
(Continued)

FOREIGN PATENT DOCUMENTS

WO 2013/026175 2/2013

OTHER PUBLICATIONS

Australian Patent Office, International Search Report for International Patent Application No. PCT/SG2015/000028, dated Jun. 10, 2015.

*Primary Examiner* — Alicia M Harrington
(74) *Attorney, Agent, or Firm* — Fish & Richardson P.C.

(57) ABSTRACT

Various stacks of arrays of beam shaping elements are described. Each array of beam shaping elements can be formed, for example, as part of a monolithic piece that includes a body portion as well as the beam shaping elements. In some implementations, the monolithic pieces may be formed, for example, as integrally formed molded pieces. The monolithic pieces can include one or more features to facilitate stacking, aligning and/or centering of the arrays with respect to one another.

14 Claims, 8 Drawing Sheets

(51) Int. Cl.
*G02B 7/00* (2006.01)
*G02B 7/02* (2006.01)
*G02B 27/09* (2006.01)

(56) References Cited

U.S. PATENT DOCUMENTS

| | | |
|---|---|---|
| 7,710,650 B2 * | 5/2010 | Inoguchi .............. G02B 5/1895 |
| | | 359/565 |
| 7,773,875 B2 | 8/2010 | Jung et al. |
| 7,944,633 B2 | 5/2011 | Shyu et al. |
| 8,526,129 B2 | 9/2013 | Hirata et al. |
| 2009/0052044 A1 | 2/2009 | Nagata |
| 2011/0063723 A1 | 3/2011 | Shyu et al. |

* cited by examiner

STACKS OF ARRAYS OF BEAM SHAPING ELEMENTS INCLUDING STACKING, SELF-ALIGNMENT AND/OR SELF-CENTERING FEATURES

FIELD OF THE DISCLOSURE

The present disclosure relates to stacks of arrays of beam shaping elements including stacking, self-alignment and/or self-centering features.

BACKGROUND

Optical imaging devices, such as multi-channel or array cameras, sometimes employ lenses stacked along the device's optical axis in order to achieve desired performance. Various problems with the lenses, however, can adversely impact the performance in such imaging applications. For example, the stacked lenses may not be properly aligned or centered, which can result in sub-optimal imaging.

SUMMARY

The present disclosure describes various stacks of arrays of beam shaping elements. Each array of beam shaping elements can be formed, for example, as part of a monolithic piece that includes a body portion as well as the beam shaping elements. In some implementations, the monolithic pieces may be formed, for example, as integrally formed molded pieces. The monolithic pieces can include one or more features to facilitate stacking, aligning and/or centering of the arrays with respect to one another.

According to one aspect, for example, one monolithic piece includes first extensions from its body portion, wherein each of the extensions has a stepped ledge on which another monolithic piece rests. In some implementations, a third monolithic piece can rest in a similar fashion on stepped ledges formed on second extensions from the body portion in an opposite direction from the first extensions.

In another aspect, one monolithic piece has extensions extending from a body portion, and the extensions having inner inclined surfaces facing corresponding outer inclined surfaces of the body portion of another monolithic piece.

According to a further aspect, a method of aligning multiple arrays of beam shaping elements includes placing a rod into a respective hole in each of the body portions, and fixing the body portions in place with respect to one another. In some implementations, each of the body portions has two or more holes for receiving such rods. The rod(s) can be removed after fixing the body portions in place with respect to one another. In some implementations, instead of (or in addition to) providing holes in the body portions to receive a centering rod, a respective first notch can be provided in a side edge of each of the body portions. Each first notch can be sized to receive a centering rod, and the first notches can be substantially aligned with respect to one another.

In yet another aspect, one monolithic piece has an indentation in its body portion, and another monolithic piece has a first projection extending from its body portion. The projection can at least partially fit within an area defined by the indentation and abut an opposing surface of the indentation. Some implementations may include multiple projections and corresponding indentations.

Various advantages can be provided in some implementations. For example, the stacking, alignment and centering features described here can, in some implementations, result in compact stacks of arrays of beam shaping elements that are better aligned. Such a stack of arrays of beam shaping elements can help improve image quality when the stack is used in imaging equipment. The techniques described here also can be used in light emitter and illuminators applications.

As described in greater detail below, various of the stacking, alignment and/or centering features can be located at the periphery of the arrays of beam shaping elements. This can prevent the stacking, alignment and/or centering features from interfering with light passing through the beam shaping elements and thus can avoid compromising image quality. Further, a wide range of beam shaping elements can be used in the arrays, as the location of the stacking, alignment and/or centering features need not limit the types of beam shaping elements that can be used. In addition, at least some of the stacking, alignment and/or centering features can be used without increasing the overall footprint of the stack of arrays of beam shaping elements.

Other aspects, features and advantages will be apparent from the following detailed description, the accompanying drawings and the claims.

DETAILED DESCRIPTION

The present disclosure describes various stacks of beam shaping elements in which two or more M×N arrays of beam shaping elements are stacked above one another. The size of the arrays can depend on the application. In general, however, at least one of M or N is ≥2. Examples of the size of each array are 1×2, 2×1, 2×2 and 4×4. Other implementations may use arrays of other sizes. In some cases, M and N have the same value, whereas in other implementations, they may differ. As explained in greater detail below, the two-dimensional arrays can include various features that help facilitate stacking, self-alignment and/or self-centering of the beam shaping elements in the stacked arrays and can be fabricated, for example, by a molding process (e.g., injection molding) or by other techniques such as photolithography. The stacking, alignment and/or centering features can be integrated with an array of beam shaping elements as a single integrally-formed monolithic piece of the same material (e.g., polymer or plastic). Depending on the implementation, two, three, four or even more such monolithic pieces, each of which includes one or more arrays of beam shaping elements, can be aligned and stacked one over the other along an optical axis.

Examples of the beam shaping elements that form the arrays include, but are not limited to, various optical elements. The optical elements may be, for example, passive elements such as lenses (e.g., diffractive or refractive). Other types of lenses also may be used (e.g., photochromic lenses, as well as other types of transformable or dynamic lenses). In some implementations, the beam shaping elements may include optical filters. The beam shaping elements for different arrays in the stack may differ from one another. Although the examples discussed in detail below illustrate lenses as the beam shaping elements, other implementations may incorporate different types of beam shaping elements.

Figure 1:
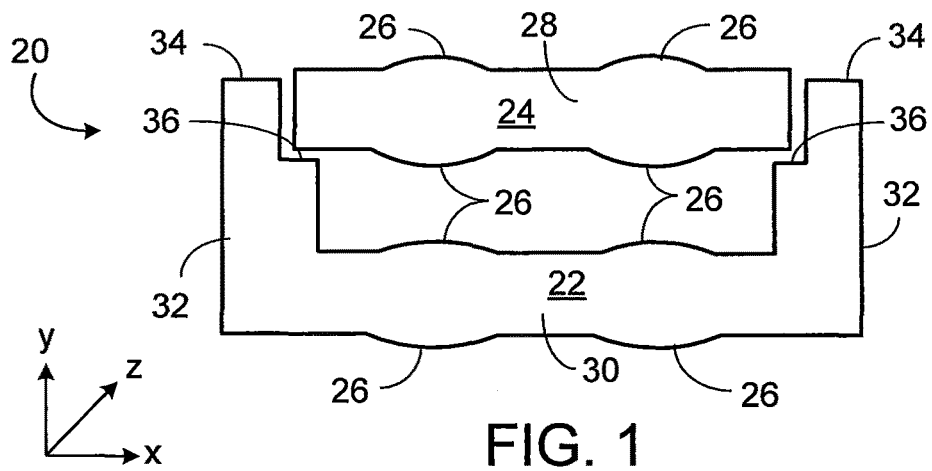
FIG. 1 is a cross-sectional view of a stack of two arrays of passive optical elements.
Figure 2:
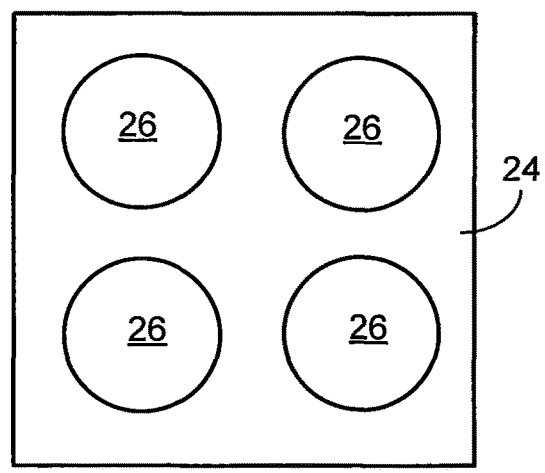
FIG. 2 is a top view of one of the arrays of FIG. 1.

FIG. 1 illustrates an example of a stack 20 of two monolithic pieces 22, 24. Each monolithic piece 22, 24 includes respective beam shaping elements (e.g., microlenses) 26. In particular, the first monolithic piece 24 includes arrays of lenses 26 on opposite sides of a body portion 28. The lenses 26 on each side of the body portion 28 can be arranged as an array (e.g., a 2×2 array as shown in FIG. 2). The second monolithic piece 22 also includes arrays of lenses 26 on opposite sides of a body portion 30. Here too, the lenses 26 on each side of the body portion 30 can be arranged as an array (e.g., a 2×2 array as shown in FIG. 2).

The body portion 30 has extensions 32 that extend in a generally perpendicular direction from the body portion 30. The extensions 32, which can extend from two opposite sides of the body portion 30 or, some cases, from all four sides of the body portion 30, are slightly thinner toward their free ends 34 so as to form inner stepped ledges 36 to support the monolithic piece 24. In some implementations, the extensions 32 are walls that extend, respectively, along the sides of the body portion 30. In some cases, the extensions 32 form sectional pieces separated from one another along the sides of the body portion 30. The dimensions of the body portion 28 of the first monolithic piece 24 are sized so that the body portion 28 can fit into an opening defined by free ends 34 of the extensions 32 and can be supported by and attached to the ledges 36 of the second monolithic piece 22. The monolithic piece 24 can rest directly or indirectly on the ledges 36 of the monolithic piece 22. For example, in some cases, an adhesive can be used to attach the monolithic pieces 22, 24 to one another, whereas in other cases, adhesive may not be used. The foregoing features can facilitate stacking and alignment of the monolithic pieces 22, 24 such that when the monolithic piece 24 is attached to the monolithic piece 22, the microlenses 26 of the two arrays are substantially aligned with one another. When the monolithic piece 24 is fixed to the stepped ledges 36, it may be at least partially surrounded by the extensions 32 of the other monolithic piece 22.

The body portion 28 together with the beam shaping elements can be a single integrally-formed monolithic piece that is composed, for example, of a molded plastic or polymer material. Likewise, the body portion 30 together with the extensions 32 and the beam shaping elements can be a single integrally-formed monolithic piece that is composed, for example, of a molded plastic or polymer material. Although the illustrated example of FIG. 1 shows beam shaping elements 26 on both sides of the body portions 28, 30, in some cases, one or both of the body portions may include beam shaping elements on only one side (e.g., the upper or lower side). In the illustrated example, each of the monolithic pieces 22, 24 is rotationally symmetric about one or more axes.

Figure 3:
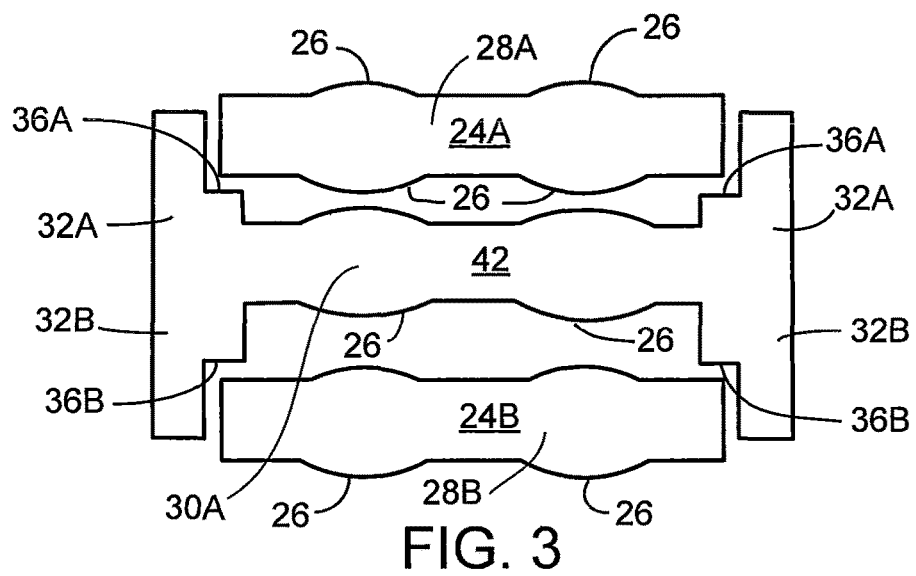
FIG. 3 is a cross-sectional view of a stack of three arrays of beam shaping elements.

FIG. 3 illustrates an example of a stack 40 of three monolithic pieces 24A, 42, 24B each of which includes an array of beam shaping elements on one or both sides of a respective body portion. The top and bottom monolithic pieces 24A, 24B can be substantially similar to the monolithic piece 24 described above in connection with FIG. 1. The middle piece 42 includes a body portion 30A that has extensions 32A, 32B extending in a generally perpendicular direction from the body portion 30A, but in opposite directions from one another. Thus, the extensions 32A extend in one direction (e.g., upward) from the body portion 30A, whereas the extensions 32B extend in the opposite direction (e.g., downward) from the body portion 30A. The extensions 32A, 32B are slightly thinner toward their free ends 34A, 34B so as to form inner stepped ledges 36A, 36B. The dimensions of the body portions 28A, 28B of the upper and lower arrays 24A, 24B are sized so that the body portions 28A, 28B can fit into respective openings defined by the free ends 34A, 34B of the extensions 32A, 32B and can be attached to the respective ledges 36A, 36B of the middle array 42. Thus, the upper piece 24A can be attached to the ledges 36A of the middle piece 42, and the lower piece 24B can be attached to the ledges 36B of the middle piece 42. The beam shaping elements 26 on each of the body portions 28A, 28B, 30 can be arranged as a respective array (e.g., a 2×2 array as shown in FIG. 2). The foregoing features can facilitate stacking and alignment of the monolithic pieces 24A, 42, 24B such that the different arrays of beam shaping elements are substantially aligned with one another.

Each of the respective pieces 24A, 42, 24B can be formed as a single integrally-formed monolithic piece composed, for example, of a molded plastic or polymer material. Although the illustrated example of FIG. 3 shows beam shaping elements 26 on both sides of the body portions 28A, 28B, 30A, in some cases, one or more of the body portions may include beam shaping elements on only one side (e.g., the upper or lower side). In the illustrated example, each of the monolithic pieces 24A, 42, 24B is rotationally symmetric about one or more axes. Further, in some implementations, the upper and lower pieces 24A, 24B are substantially identical to one another. In other implementations, they may differ from one another in some respects (e.g., different dimensions).

Figure 4:
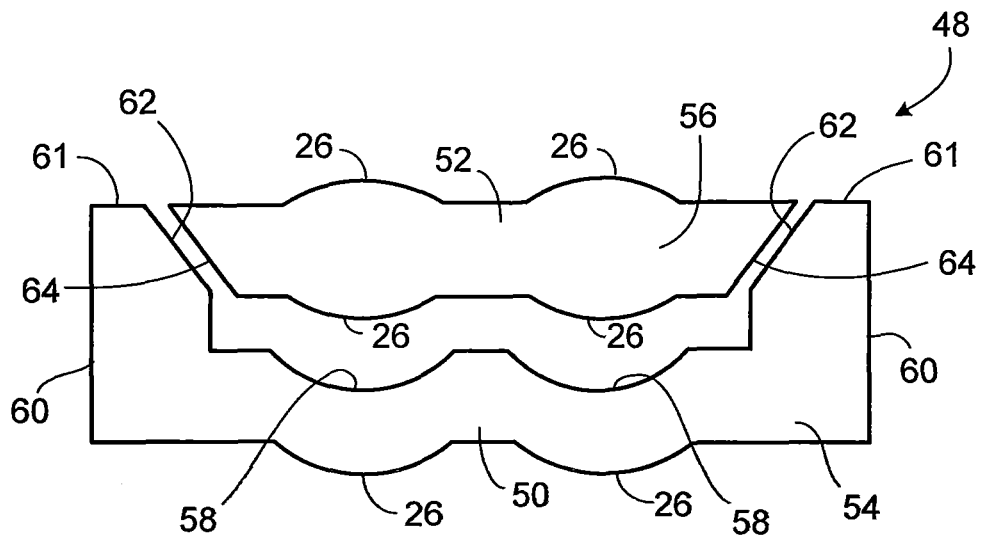
FIG. 4 is a cross-sectional view of another stack of two arrays of beam shaping elements.

FIG. 4 illustrates an example of a stack 48 of monolithic pieces 50, 52 that incorporate another type of alignment and centering features. In the illustrated example, a first body portion 54 has beam shaping elements (e.g., convex microlenses) 26 on one side (i.e., the bottom side) and beam shaping elements (e.g., concave microlenses) 58 on its second side (i.e., the top side). The beam shaping elements 26 on the body portion 54 can be arranged as an array (e.g., a 2×2 array). Likewise, the beam shaping elements 58 can be arranged as an array (e.g., a 2×2 array) such that each element 58 on one side is aligned with a corresponding element 26 on the other side. Similarly, a second body portion 56 has an array 52 of beam shaping elements (e.g., microlenses) 26 on at least one of its sides, but may include beam shaping elements (e.g., microlenses) on its second side as well. Here too, the beam shaping elements 26 on each side of the body portion 56 can be arranged as arrays (e.g., a 2×2 arrays) that are aligned with respect to one another.

The body portion 54 of the lower piece 50 has extensions 60 that extend in a generally perpendicular direction from the body portion 54. In some implementations, the extensions 60 are walls that extend, respectively, along the sides of the body portion 54. In some cases, the extensions 60 form sectional pieces along the sides of the body portion 54. The extensions 60 have inner inclined side edges 62 that slant inwardly in a direction from the free ends 61 toward the indented concave regions 58. The body portion 56 of the piece 52 also has outer side edges 64 that are inclined so as to slant inwardly from the top side of the body region towards its bottom side. The shape and dimensions of the inclined outer side edges 64 substantially match the inclined inner side edges 62, which can facilitate self-alignment and self-centering of the arrays on the upper piece 52 with respect to the arrays on the lower piece 50. In particular, the body 56 of the upper piece 52 can fit into an opening defined by the free ends 61 of the extensions 60 extending from the body 54 of the lower piece 50 such that the outer inclined side edges 64 of the upper body portion 56 come into contact with, and rest against, the inner inclined side edges 62 of the lower body portion 54. The monolithic piece 52 can rest directly or indirectly on the inclined surfaces 62 of the monolithic piece 50. For example, in some cases, an adhesive can be used to attach the monolithic pieces 50, 52 to one another, whereas in other cases, adhesive may not be used. The upper piece 52 is thus at least partially surrounded laterally by the extensions 60 of the lower piece 50. The foregoing features can facilitate stacking and alignment of the monolithic pieces 50, 52 such that when the pieces 50, 52 are attached to one another, the beam shaping elements 26 of the different arrays are substantially aligned with one another. Here too, each of the respective pieces 50, 52 can be a single integrally-formed monolithic piece composed, for example, of a molded plastic or polymer material.

Figure 5:
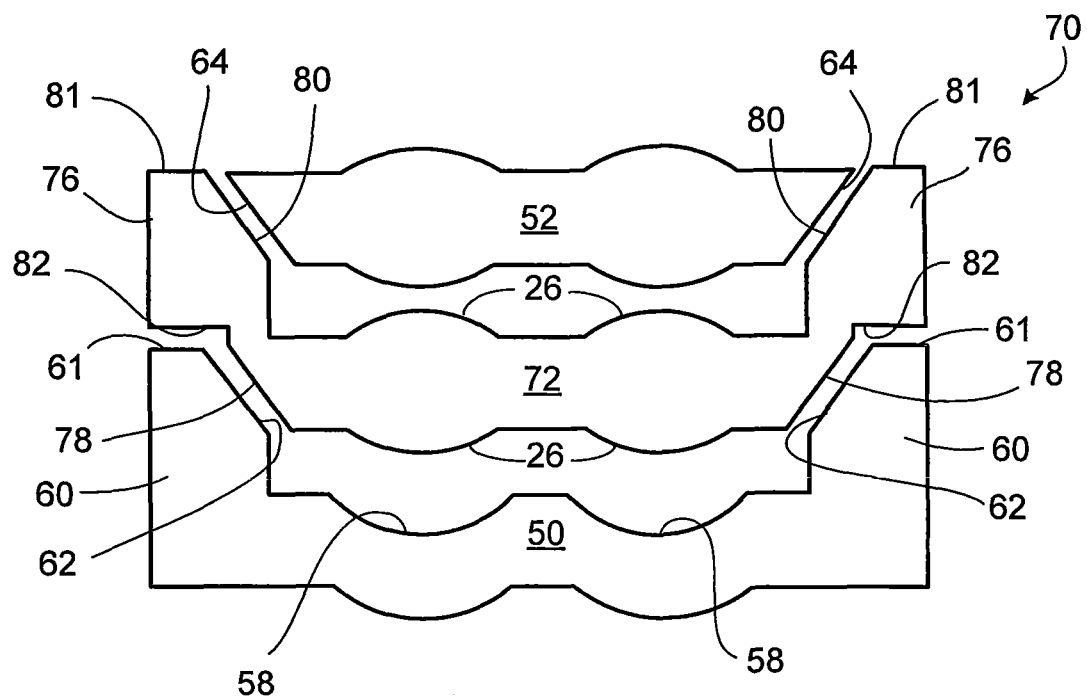
FIG. 5 is a cross-sectional view of a further stack of three arrays of beam shaping elements.

FIG. 5 illustrates an example of a stack 70 of three monolithic pieces each of which includes one or more arrays of beam shaping elements. The stack, which includes self-alignment and self-centering features similar to those described in connection with FIG. 4, includes a first bottom piece 50, a second middle piece 72 and a third top piece 52. The top and bottom pieces 52, 50 can be substantially the same as described above for the corresponding arrays in FIG. 4. The middle piece 72 has a body portion 74 that can include beam shaping elements (e.g., microlenses) 26 on one or both of its top and bottom sides.

Outer side edges 78 at the lower part of the body portion 74 of the middle piece 72 are inclined and slanted inwardly in a direction toward the lenses 26 on the bottom side of the piece 72. The outer side edges 78 are shaped and sized to substantially match the inclined inner surfaces 62 of the lower piece 50. The shape and dimensions of the inclined outer side edges 78 substantially match the inclined inner surfaces 62 of the bottom piece 50, which can facilitate self-alignment and self-centering of the beam shaping elements of the middle piece 72 with respect to the beam shaping elements of the bottom piece 50.

The body portion 74 of the middle piece 72 also has extensions 76 that extend upwardly and outwardly from the body portion. The extensions 76 can be similar to the extensions 60 of the bottom piece 50 and have inner inclined side edges 80 that slant inwardly in a direction from free ends 81 of the extensions 76 toward the beam shaping elements 26 on the top side of the piece 72. The shape and dimensions of the inclined inner side edges 80 substantially match the inclined outer side edges 64 of the top piece 52, which can facilitate self-alignment and self-centering of the beam shaping elements of the top piece 52 with respect to the beam shaping elements of the middle piece 72.

The top piece 52 can fit into an opening defined by the free ends 81 of the extensions 76 of the middle piece 72 so that the outer inclined side edges 64 of the body portion of the upper piece 52 come into contact with, and rest against, the inner inclined side edges 80 of the middle piece 72. Likewise, the middle piece 72 can fit into an opening defined by the free ends 61 of the extensions 60 of the bottom piece 50 and so that the outer inclined side edges 78 of the middle piece come into contact with, and rest against, the inner inclined side edges 62 of the bottom piece. The lower surfaces 82 of the extensions 76 of the middle piece 72 also are in contact with the ends 61 of the bottom piece 50. In some cases, an adhesive can be used to attach the surfaces of the monolithic pieces 50, 72, 52 to one another. The foregoing features can facilitate stacking and alignment of the pieces 50, 72, 52 such that the beam shaping elements 26 of the three arrays are substantially aligned with one another. Here too, each of the respective pieces 50, 72, 52 can be a single integrally-formed monolithic piece and can be composed, for example, of a molded plastic or polymer material.

Any of the foregoing stacks of beam shaping elements (e.g., the stacks of lens arrays of FIG. 1, 3, 4 or 5) can be installed, for example, in a frame such as a lens barrel. In some implementations, the frame (e.g., lens barrel) can be molded around the monolithic pieces forming the stack of beam shaping elements. The arrays of beam shaping elements can be held in place with respect to one another by the frame or other structure.

Figure 6:
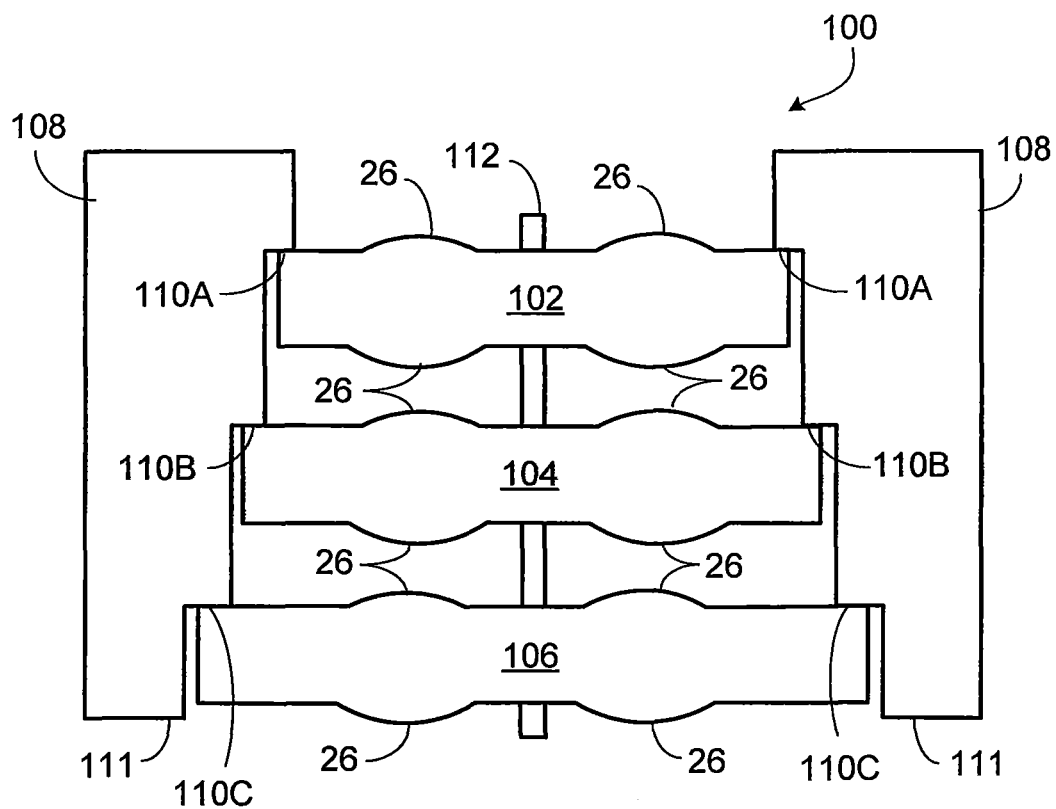
FIG. 6 is a cross-sectional view of a lens barrel including a stack of three arrays of beam shaping elements.
Figure 7:
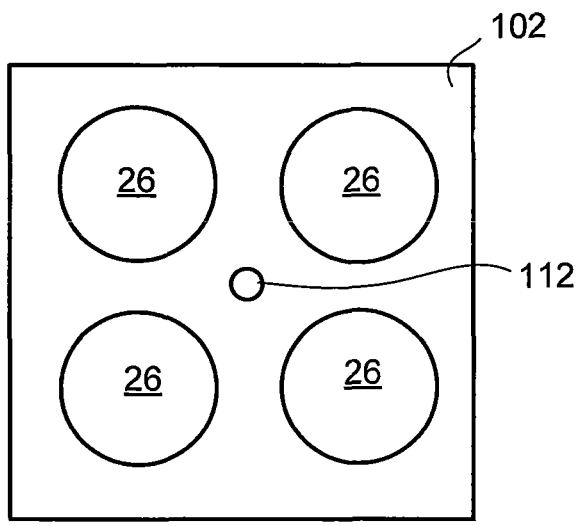
FIG. 7 is a top view of one of the arrays of FIG. 6.

FIGS. 6 and 7 illustrate a stack 100 of monolithic pieces 102, 104, 106 each of which includes one or more arrays of beam shaping elements 26. The stack 100 is installed in a frame such as a lens barrel 108. Each of the respective pieces 102, 104, 106 can be a single integrally-formed monolithic piece and can be composed, for example, of a molded plastic or polymer material. The frame 108 can be configured to facilitate stacking and alignment of the arrays of beam shaping elements. In particular, the inner surface of the frame 108 has inverted steps or ledges 110A, 110B, 110C to which the respective pieces 102, 104, 106 can be attached. Each of the pieces 102, 104, 106 can be similar to the piece 24 of FIG. 1, and each array can have the same number of beam shaping elements. However, as illustrated in FIG. 6, the top piece 102 is smaller than the middle piece 104, which, in turn, is smaller than the bottom piece 106. This allows the pieces 102, 104, 106 to be installed through an opening defined by the bottom 111 of the frame 108. The pieces 102, 104, 106 can be pushed sequentially into the frame 108 until they are flush with a respective one of the steps 110A, 110B, 110C. To facilitate installing the pieces 102, 104, 106 into the frame 108, there may be some tolerance between the side edges of each piece 102, 104, 106 and the inner sides of the frame 108.

Before fixing the stack 100 to the frame 108, the pieces 102, 104, 106 can be aligned more accurately by inserting a centering rod 112 through a hole in the middle of each piece. Once the pieces 102, 104, 106 are fixed (e.g., by adhesive) to the frame 108, the centering rod 112 can be removed. Although the illustrated configuration shows the smallest piece 102 at the top of the stack 100 and the largest piece 106 at the bottom of the stack 100, in other implementations the stack (and the frame 108) can be inverted so that the smallest piece 102 is at the bottom of the stack and the largest piece is at the top of the stack. Each of the holes through which the centering rod 112 extends should be a through-hole that extends from one surface of monolithic piece (e.g., 102) to an opposite surface of the monolithic piece. In some cases, it may be sufficient for the centering rod 112 to extend only partially into the top (or bottom) monolithic piece. In some implementations, the centering rod 112 can be used without increasing the overall footprint of the stack of arrays of beam shaping elements.

Figure 8:
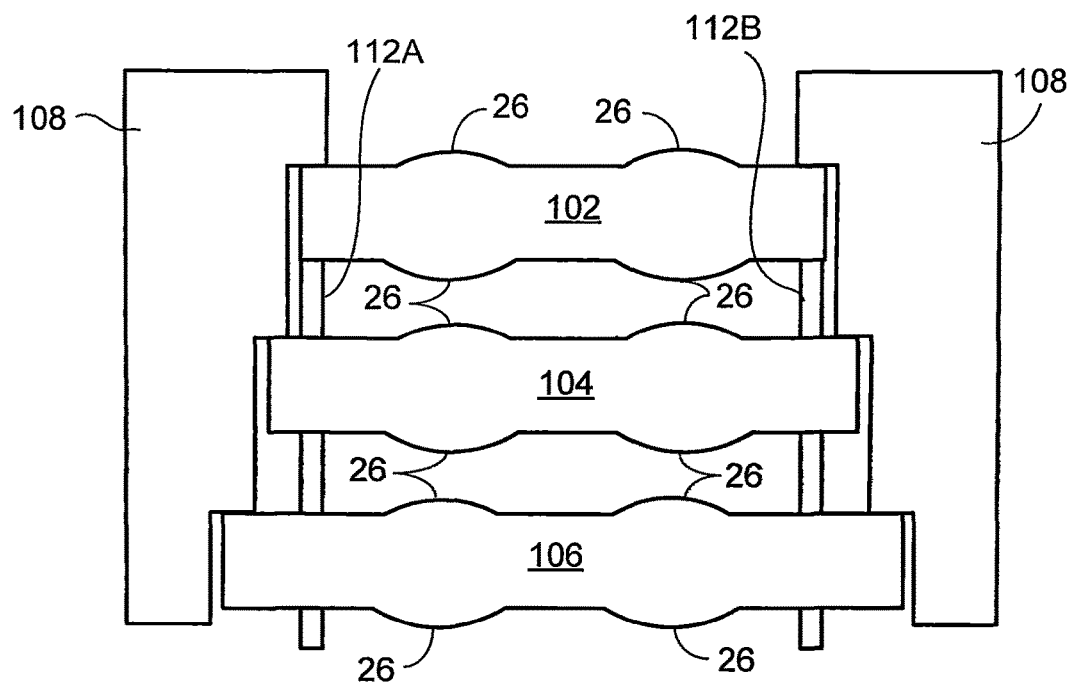
FIG. 8 is a cross-sectional view of a lens barrel including a stack of three arrays of beam shaping elements.
Figures 9, 10:
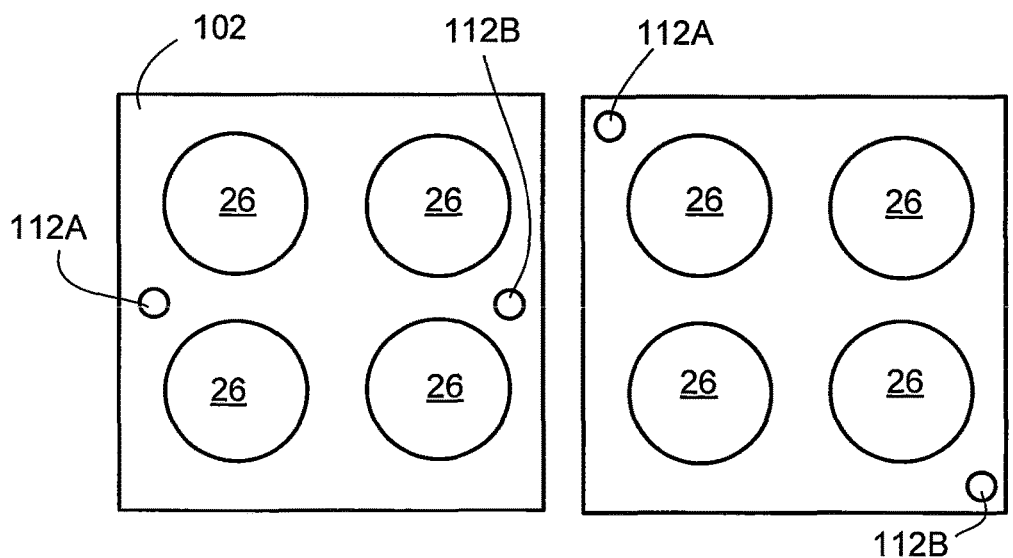
FIG. 9 is a top view of one of the arrays of FIG. 8 according to a first implementation.
FIG. 10 is a top view of one of the arrays of FIG. 9 according to a second implementation.

In some implementations, instead of using a single centering rod 112 as in FIGS. 6 and 7, multiple rods 112A, 112B can be used as illustrated in FIGS. 8, 9 and 10. The use of multiple rods can help prevent rotation of the pieces 102, 104, 106. Rods 112A, 112B can be placed vertically through the arrays near opposite side edges of the pieces 102, 104, 106, for example, as shown in FIG. 9 or near opposite corners of the pieces 102, 104, 106, for example, as shown in FIG. 10. Although the illustrated examples show the use of two rods 112A, 112B, other implementations may use more than two rods. Further, the rods 112A, 112B may extend through other parts of pieces 102, 104, 106. Once the pieces 102, 104, 106 are fixed to the frame 108, the rods 112A, 112B can be removed.

Figure 11:
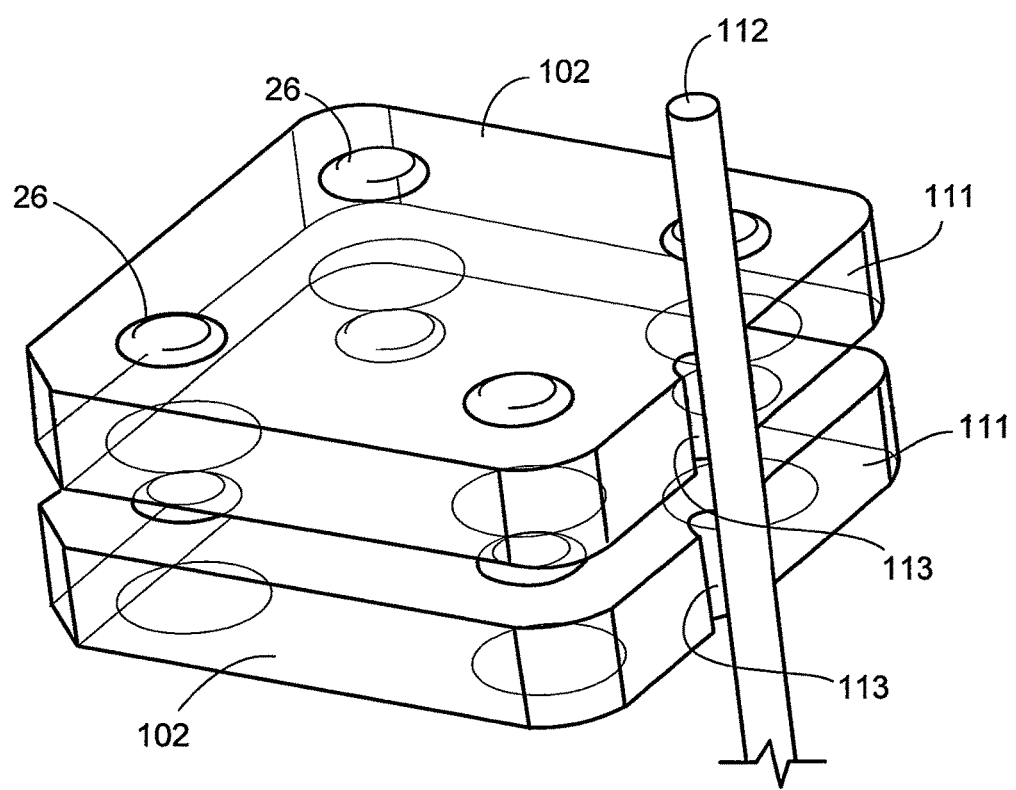
FIG. 11 is a perspective view of a stack of arrays of beam shaping elements according to another implementation.

In some implementations, instead of inserting a rod 112 into through-holes in the bodies of the pieces 102, 104, 106, a side edge of each piece can have a respective notch (e.g., a groove) that extends from its upper surface to its lower surface. An example is illustrated in FIG. 11, which shows a stack of multiple monolithic pieces 102, each of which has an array of beam shaping elements 26 on one or both of its top and bottom surfaces. In particular, a side edge 111 of each piece 102 has a respective notch 113 that extends from the top surface to the bottom surface of the piece. A rod 112 can be placed adjacent (e.g., in contact with) the notches 113 so as facilitate alignment of the pieces 102 with one another. In some implementations, each piece 102 may include multiple notches 113, either on the same side edge or on different side edges. Using multiple notches can help prevent rotation of the pieces prior to fixing them, for example, to a frame such as a lens barrel. Once again, after the monolithic pieces are attached, for example, to a frame (e.g., a lens barrel), the rOd(s) may be removed.

Figure 12:
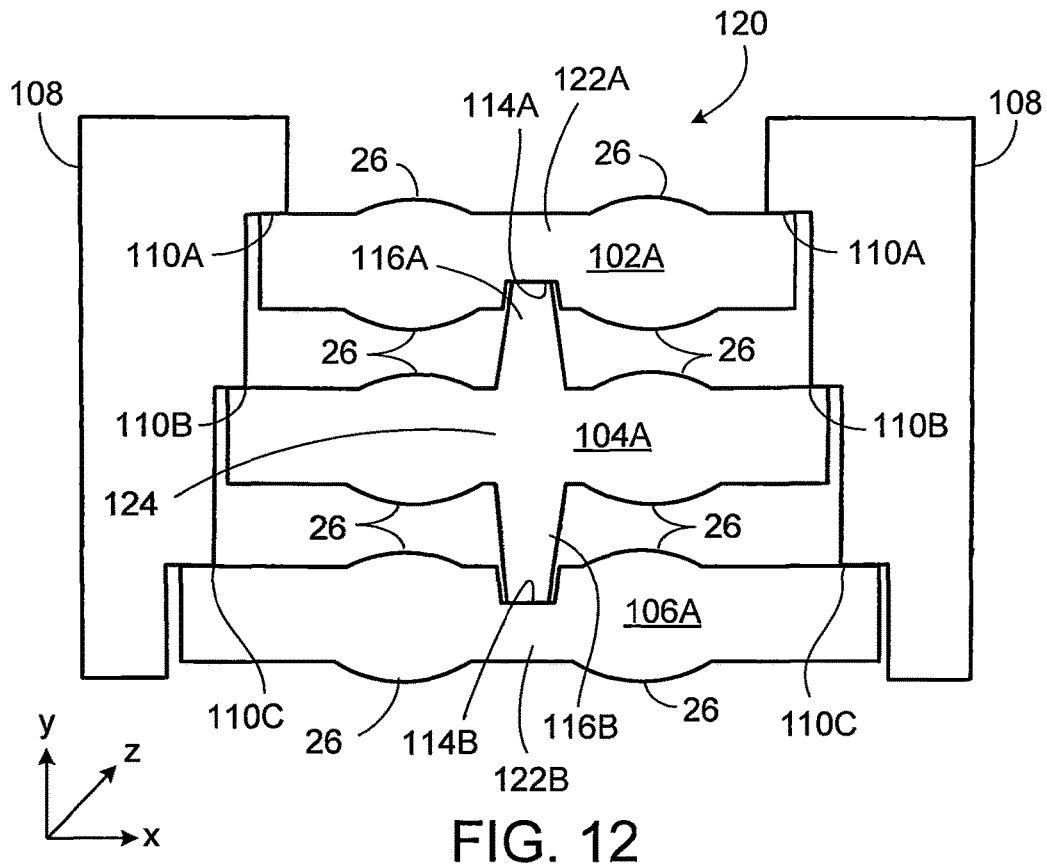
FIG. 12 is a cross-sectional view of a frame including a stack of three arrays of beam shaping elements.
Figure 13:
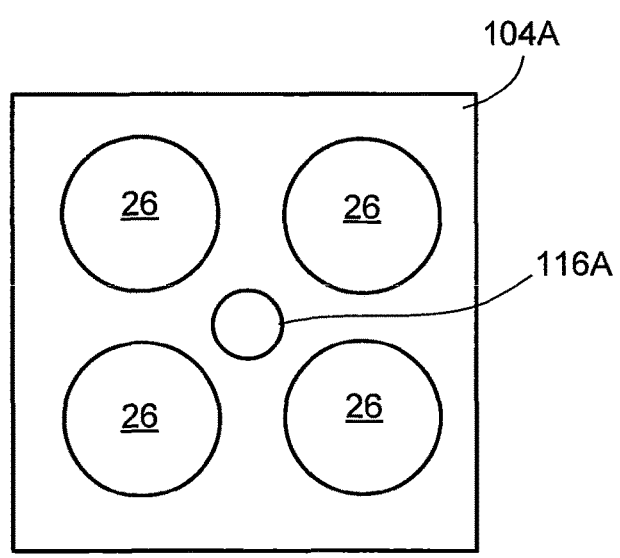
FIG. 13 is a top view of one of the arrays of FIG. 12.

FIGS. 12 and 13 illustrate another stack 120 of multiple monolithic pieces 102A, 104A, 106A each of which includes one or more arrays of beam shaping elements and which are installed in a frame such as a lens barrel 108. The stack of FIG. 12 is similar to the stack 100 of FIG. 6. However, instead of a centering rod 112 to facilitate stacking and alignment of the lens arrays, the body portions of the pieces 102A, 104A, 106A themselves include additional stacking and alignment features in the form of projections 116A, 116B and corresponding indentations 114A, 114B. In particular, as illustrated in FIGS. 12 and 13, the body portion 124 of the middle piece 104A includes at least one respective projection 116A, 116B on each of its upper and lower surfaces. The projections also may be referred to as extensions. In the illustrated example, each projection 116A, 116B is disposed between a respective pair of the beam shaping elements 26. The body 122A, 122B of each of the upper and lower pieces 102A, 106A includes a respective indentation 114A, 114B that corresponds to one of the projections 116A, 116B. Thus, each projection 116A, 116B of the middle piece 104A is at least partially laterally surrounded by a portion of one of the other pieces 102A, 106A. In particular, the projection 116A on the top of the middle piece 104A at least partially fits within an area defined by the indentation 114A in the body 122A of the top piece 102A and abuts an opposing surface of the indentation 114A. Likewise, the projection 116B on the bottom of the middle piece 104A at least partially fits within an area defined by the indentation 114B in the body 122B of the bottom piece 106A and abuts an opposing surface of the indentation 114B. In some cases, there may be some tolerance between the outer side edges of each projection 116A, 116B and the inner side surfaces of the corresponding indentation 114A, 114B. Further, in some implementations, an adhesive may be provided to attach the projections 116A, 116B to the inner surface of the corresponding indentation 114A, 114B.

As shown in FIG. 12, in some implementations, the piece 104A can be rotationally symmetric such that the projections 116A, 116B are substantially the same as one another. In other cases, the projections 116A, 116B may differ from one another in some respects (e.g., different size or shape). The shape of the projections 116A, 116B, when viewed from the top, can be circular, as shown in FIG. 13, or some other shape (e.g., rectangular, triangular, or polygonal). Each of the respective pieces 102A, 104A, 106A can be a single integrally-formed monolithic piece and can be composed, for example, of a molded plastic or polymer material.

Figure 14:
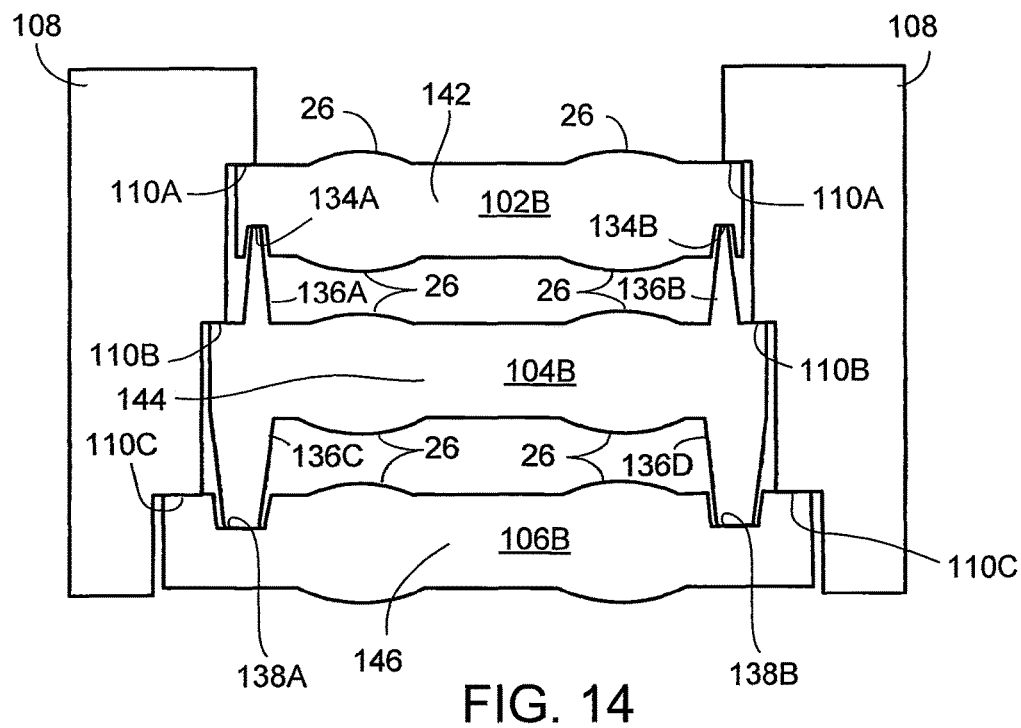
FIG. 14 is a cross-sectional view of a frame including a stack of three arrays of beam shaping elements.

To prevent undesirable rotation of the lens arrays, each side of the body of the middle piece can include two or more projections, which also may be referred to as extensions. An example is illustrated in FIG. 14, in which the body 144 of the middle piece 104B includes two projections 136A, 136B on its upper surface and two projections 136C, 136D on its lower surface. The body 142 of the top piece 102B includes two indentations 134A, 134B, which are sized and located to correspond to the projections 136A, 136B in the top surface of the body 144 of the middle piece 104B. Likewise, the body 146 of the bottom piece 106B includes two indentations 138A, 138B, which are sized and located to correspond to the projections 136C, 136D in the bottom surface of the body 144 of the middle piece 104B. Thus, the projections 136A, 136B on the top of the middle piece 104B at least partially fit within respective area defining the corresponding indentations 134A, 134B in the body 142 of the top piece 102B. Further, each projection 136A, 136B abuts an opposing surface of the corresponding indentation 134A, 134B. Likewise, the projections 136C, 136D on the bottom of the middle piece 104B at least partially fit within respective areas defining the corresponding indentations 138A, 138B in the body 146 of the bottom piece 106B. Further, each projection 136C, 136D abuts an opposing surface of the corresponding indentation 138A, 138B. Thus, each projection 136A, 136B, 136C, 136D of the middle piece 104B is at least partially laterally surrounded by a portion of one of the other pieces 102B, 106B. In some cases, there may be some tolerance between the outer side edges of each projection 136A, 136B, 136C, 136D and the inner side surfaces of the corresponding indentation 134A, 134B, 138A, 138B. Further, in some implementations, an adhesive may be provided to attach the projections 136A, 136B, 136C, 136D to the inner surface of the corresponding indentation 134A, 134B, 138A, 138B.

Figures 15, 16:
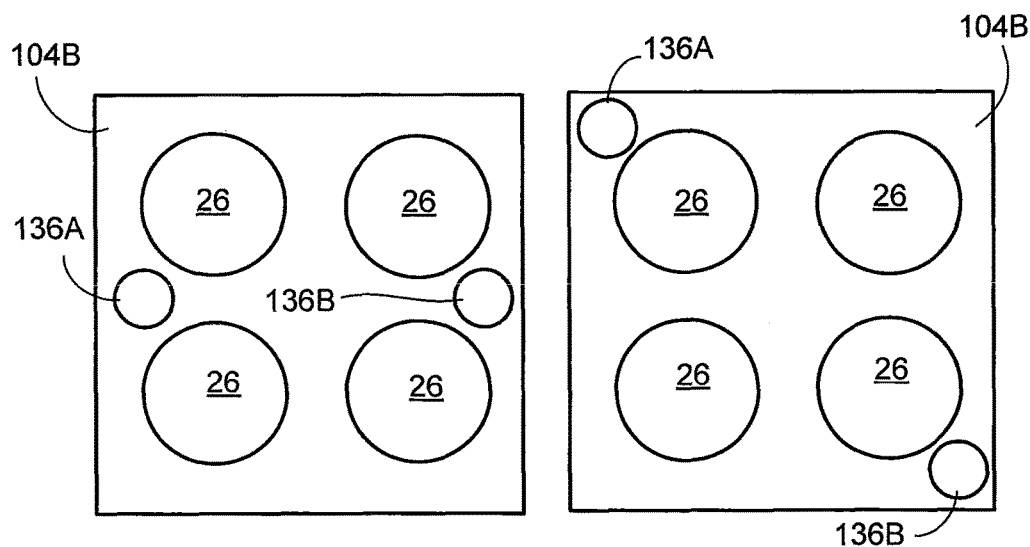
FIG. 15 is a top view of one of the arrays of FIG. 14 according to a first implementation.
FIG. 16 is a top view of one of the arrays of FIG. 14 according to a second implementation.

The projections 136A, 136B, 136C, 136D (and the indentations 134A, 134B, 138A, 138B) can be located, for example, near opposite side edges of the monolithic pieces, for example, as shown in FIG. 15 or near opposite corners of the monolithic pieces, for example, as shown in FIG. 16. As further illustrated in FIG. 14, the shape or size of the projections 136A, 136B on the top surface of the body 144 of the middle piece 104B may differ from that of the projections 136C, 136D on its bottom surface. In general, the shape of the projections 136A, 136B, 136C, 136D, when viewed from the top, can be circular, rectangular, triangular, polygonal or some other shape. Each of the respective pieces 102B, 104B, 106B (including the beam shaping elements, the body portion, and the projections (if present)) can be a single integrally-formed monolithic piece and can be composed, for example, of a molded plastic or polymer material.

Figure 17:
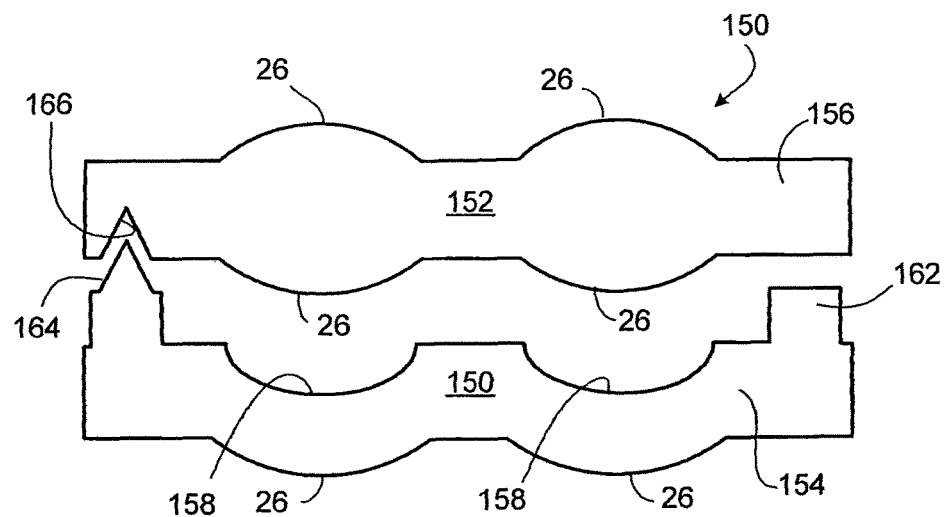
FIG. 17 is a cross-sectional view of a stack of two arrays of beam shaping elements.
Figure 18:
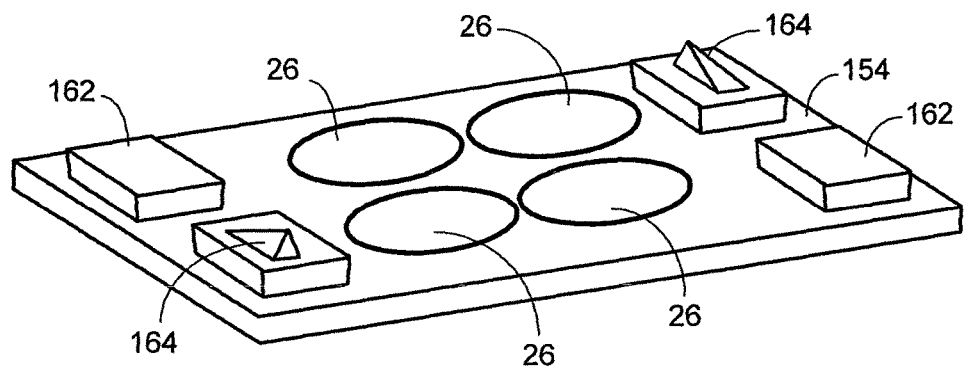
FIG. 18 is a perspective view of the stack of FIG. 17.

The features described above can be combined in various ways to obtain additional implementations. For example, FIGS. 17 and 18 illustrate another stack 150 of arrays of beam shaping elements including a first bottom piece 150 and a second top piece 152. The pieces 150, 152 are somewhat similar, respectively, to the pieces 50, 52 of FIG. 4. In particular, the body 154 of the bottom piece 150 has arrays of beam shaping elements 158, 26 on its upper and lower surfaces, respectively, and the body 156 of the top piece 152 has arrays of beam shaping elements on its upper and lowers surfaces. However, instead of inclined surfaces 62, 64 as in the implementation of FIG. 4, the upper surface of the body 154 of the bottom piece 150 includes multiple projections 164 that are sized and shaped to correspond to indentations 166 in, the lower surface of the body 156 of the top piece 152.

To facilitate understanding, some of the drawings (e.g., FIGS. 1, 3, 4, 5, 17) show a slight separation between the monolithic pieces (e.g., 22 and 24 in FIG. 1). As explained above, however, when stacked one over another, the features of one monolithic piece (e.g., 22) are in direct or indirect contact with features of an adjacent monolithic piece (e.g., 24). Thus, in some implementations, one monolithic piece may simply rest on another monolithic piece; in other cases, the monolithic pieces may attached together, for example, by adhesive.

Using the stacking, alignment and centering features described here can, in some implementations, result in compact stacks of arrays of beam shaping elements that are better aligned. Such a stack of arrays of beam shaping elements can help improve image quality when the stack is integrated into imaging equipment (e.g., a camera).

Terms such as upper, lower, top and bottom are used in the present disclosure as relative terms of position to facilitate understanding, but are not intended to limit the invention.

Various modifications may be made within the spirit of the invention. Thus, other implementations are within the scope of the claims.

What is claimed is:

1. An apparatus comprising a stack of arrays of beam shaping elements, the stack comprising:
    a first monolithic piece including a first body portion and an array of beam shaping elements;
    a second monolithic piece including a second body portion and an array of beam shaping elements;
    a third monolithic piece including a third body portion and an array of beam shaping elements,
    wherein the second monolithic piece includes first extensions from the second body portion in a first direction, wherein the first extensions form a stepped ledge on which the first monolithic piece rests, and
    wherein the second monolithic piece includes second extensions from the second body portion in a second direction opposite the first direction, wherein the second extensions form a stepped ledge on which the third monolithic piece rests, the first and second extensions having a same shape as one another.

2. The apparatus of claim 1 wherein at least one of the monolithic pieces includes respective arrays of beam shaping elements on opposite sides of its body portion.

3. The apparatus of claim 1 wherein multiple ones of the monolithic pieces include respective arrays of beam shaping elements on opposite sides of their respective body portions.

4. The apparatus of claim 1 wherein each of the monolithic pieces is an integrally molded piece.

5. An apparatus comprising a stack of arrays of beam shaping elements, the stack comprising:
    a first monolithic piece including a first body portion and an array of beam shaping elements; and
    a second monolithic piece supporting the first monolithic piece, the second monolithic piece including a second body portion and an array of beam shaping elements, the second monolithic piece having a maximum lateral dimension that is greater than a maximum lateral dimension of the first monolithic piece;
    a third monolithic piece supporting the second monolithic piece, the third monolithic piece including a third body portion and an array of beam shaping elements, the third monolithic piece having a maximum lateral dimension that is the same as the maximum lateral dimension of the second monolithic piece,
    wherein the second monolithic piece has extensions from the second body portion, the extensions having inwardly-facing inclined surfaces facing corresponding outwardly-facing inclined surfaces of the first body portion such that the inwardly-facing inclined surfaces of the second monolithic piece laterally surround the outwardly-facing inclined surfaces of the first monolithic piece, and
    wherein the third monolithic piece has extensions from the third body portion, the extensions having inwardly-facing inclined surfaces facing corresponding outwardly-facing inclined surfaces of the second body portion such that the inwardly-facing inclined surfaces of the third monolithic piece laterally surround the outwardly-facing inclined surfaces of the second monolithic piece.

6. The apparatus of claim 5 wherein the beam shaping elements in each of the arrays are aligned with one another.

7. The apparatus of claim 5 wherein each of the monolithic pieces is an integrally molded piece.

8. An apparatus comprising a stack of arrays of beam shaping elements, the stack comprising:
    a first monolithic piece including a first body portion and an array of beam shaping elements;
    a second monolithic piece including a second body portion;
    a third monolithic piece including a third body portion and an array of beam shaping elements,
    wherein the second monolithic piece is disposed between the first and third monolithic pieces, the second monolithic piece having a first array of beam shaping elements on a first side of the second body portion facing the first monolithic piece, and having a second array of beam shaping elements on a second opposite side of the second body portion facing the third monolithic piece,
    wherein the first monolithic piece has an indentation in its body portion, and
    wherein the second monolithic piece has a first projection extending from its body portion and extending beyond an outer surface of the first array of beam shaping elements, the first projection at least partially fitting within an area defined by the indentation and abutting an opposing surface of the indentation, wherein the third monolithic piece has an indentation in its body portion, and the second monolithic piece further including a second projection extending from its body portion and extending beyond an outer surface of the second array of beam shaping elements, the second projection at least partially fitting within an area defined by the indentation in the body portion of the third monolithic piece and abutting an opposing surface of the indentation in the body portion of the third monolithic piece.

9. The apparatus of claim 8 wherein beam shaping elements of the arrays comprise lens elements.

10. The apparatus of claim 8 wherein the beam shaping elements of the respective arrays are aligned with one another.

11. The apparatus of claim 8 wherein the first and second projections differ in at least one of size or shape.

12. The apparatus of claim 8 wherein the second monolithic piece includes at least two projections extending from a first surface of its body portion and at least two projections extending from a second surface on an opposite side of the body portion, wherein the first monolithic piece includes a plurality of indentations corresponding to the projections from the first surface of the body portion of the second monolithic piece, wherein the third monolithic piece includes a plurality of indentations corresponding to the projections from the second surface of the body portion of the second monolithic piece, wherein each projection extending from the first surface of the body portion of the second monolithic piece at least partially fits within an area defined by a corresponding one of the indentations of the first monolithic piece and abuts an opposing surface of the corresponding indentation, and wherein each projection extending from the second surface of the body portion of the second monolithic piece at least partially fits within an area defined by a corresponding one of the indentations of the third monolithic piece and abuts an opposing surface of the corresponding indentation.

13. The apparatus of claim 12 wherein the projections extending from the first and second surfaces of the body portion of the second monolithic piece differ from one another in at least one of size or shape.

14. The apparatus of claim 8 wherein each of the monolithic pieces is an integrally molded piece.

* * * * *